United States Patent
Engle et al.

(10) Patent No.: US 11,983,076 B2
(45) Date of Patent: May 14, 2024

(54) CLONE-AWARE BACKUP AND RESTORE

(71) Applicant: Oracle International Corporation, Redwood Shores, CA (US)

(72) Inventors: Thomas Engle, Nashua, NH (US); Diane Lebel, Methuen, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/966,772

(22) Filed: Oct. 14, 2022

(65) Prior Publication Data

US 2024/0126654 A1  Apr. 18, 2024

(51) Int. Cl.
  *G06F 11/14* (2006.01)
(52) U.S. Cl.
  CPC ...... *G06F 11/1451* (2013.01); *G06F 11/1469* (2013.01); *G06F 2201/84* (2013.01)
(58) Field of Classification Search
  CPC ............. G06F 11/1451; G06F 11/1469; G06F 2201/84
  See application file for complete search history.

(56) References Cited

U.S. PATENT DOCUMENTS

2015/0212894 A1* 7/2015 Pawar ................. G06F 11/1448
                                                   707/679
2020/0250049 A1* 8/2020 Lee ..................... G06F 11/1471

* cited by examiner

*Primary Examiner* — Nadeem Iqbal
(74) *Attorney, Agent, or Firm* — Hickman Becker Bingham Ledesma LLP

(57) ABSTRACT

Techniques are described for backup and restore of a thin-cloned data file. The process iterates through a plurality of memory portions of the thin-cloned data file and determines whether a memory portion of the thin-cloned data file is a memory portion with common data shared with the source data file. Without storing the common data of the shared memory portion into the thin-backup data file, the process stores placeholder metadata and corresponding reference to the shared memory portion for the thin-backup data file, in an embodiment. At restore, the process may replicate the derivative data, different from the common data, from the thin-backup data file into the thin-restored data file. For the common data, the process restores a reference for the thin-restored data file to the share memory portion, in an embodiment.

20 Claims, 11 Drawing Sheets

CLONE-AWARE BACKUP AND RESTORE

FIELD OF THE TECHNOLOGY

The present invention relates to the field of electronic database management, in particular, to clone-aware backup and restore.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The growth of electronic data creates a necessity for efficient backup and restores. In order to prevent any data loss when a critical event occurs, data backup is performed at regular intervals. The backup may be performed at different levels of the application stack. For example, in database management systems (DBMSs), backup may be performed on the application level by storing previously executed database commands, on the system level by logging changes to the database objects, and on the file system level by making copies of the files, even on a binary level by making an exact image of 1's and 0's of the database.

When file system-based backup is performed, copies of the files and/or file system are made and labeled with the corresponding time. When a critical event occurs and the backup data needs to be restored, the system accesses the latest backup data before the critical event and restores the data accordingly.

The greater the amount of data, the longer it takes to perform both the backup and restore. Even if the data is stored in an efficient manner to save space, the backup and/or restore procedures may not preserve the storage efficiency. In particular, the restore procedures generally expand the backed-up data in its original form, which may not be its original storage form. For example, the data in the backup data may be stored using a compression algorithm to save space. At the restore, such data is decompressed for the data in a file to be readily used by the operating system for read/write operations.

As another example, when a data set is cloned from a source data set, to save space, the cloned dataset may be using the source data set for the original data. Once any data in the cloned dataset is modified, the changed data ("derivative data") becomes only part of the cloned dataset but not part of the source data set. Accordingly, the cloned dataset only stores derivative data while maintaining references to a portion of the source data set for the rest of the cloned dataset. The portion of the source data referred to is termed herein as common data.

However, when the cloned dataset is backed up into a backup data set, the backup systems ensure that a full copy of the cloned data set is copied. And when such a copy is performed, the common data from the source data set, rather than the references thereto, is also copied into the backup data set. The backup data set of the cloned dataset includes both the derivative data and the common data, while the cloned dataset includes only the derivative data and references to the common data.

The problem is further exacerbated when the backup dataset is restored. Once restored, the restored data set includes both the common data and the derivative data. Accordingly, the thin-cloned data set before the restore (that only included the derivative data and source data only by reference) is transformed and expanded to include both the derivative data and the common data at their respective full size.

BRIEF DESCRIPTION OF THE DRAWINGS

In the drawings of certain embodiments in which like reference numerals refer to corresponding parts throughout the figures.

DETAILED DESCRIPTION

Figure 1:
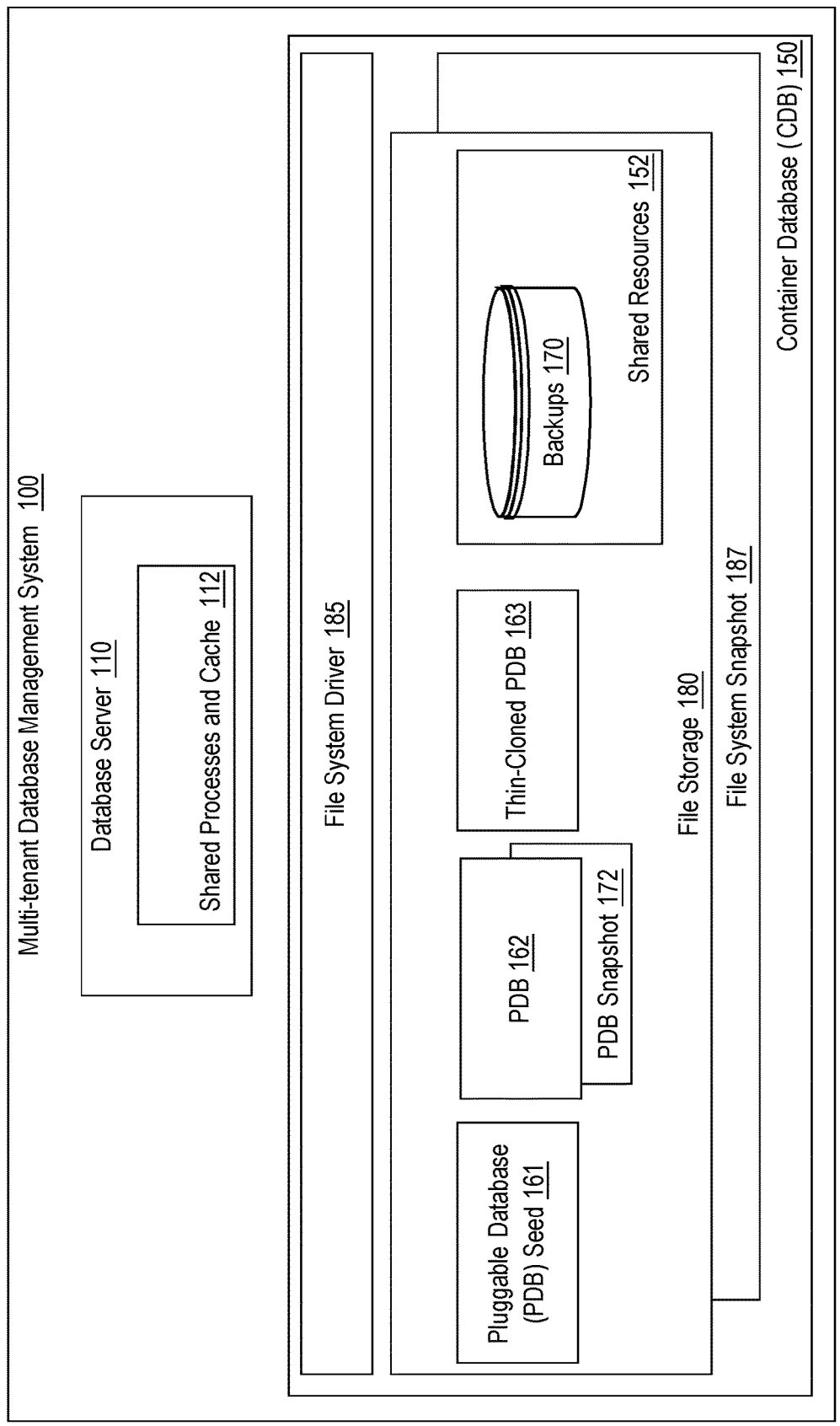
FIG. 1 is a block diagram that depicts a multi-tenant database management system (mDBMS) upon which embodiment(s) of the invention may be implemented.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe the backup and restore of a cloned data set based on the arrangement of the cloned data set. The term "cloned data set" refers herein to a data set that has been generated from a source data set, partially or completely. In an embodiment, when cloning, the system, rather than copying data from the source data set and referencing the newly copied data in the cloned data set, generates only reference(s) to the source data set. The term "thin-cloned data set" refers to the cloned data set, which, when cloned, references the common data of the source data set from which the cloned dataset was cloned. Accordingly, only a single copy of data exists but is referenced both by the source data set and the thin-cloned data set. For example, in a file system, a newly thin-cloned data file reference the same memory portion(s) as the source data file from which the cloned data file was cloned. A memory portion may be a block, a group of data blocks, a continuous sequence of data blocks (extent), and/or a segment that includes multiple extents. Non-limiting examples of references are memory addresses, memory address offsets, memory address ranges or offset ranges, or indices (array of pointers).

When a modification is requested to a thin-cloned dataset, any new data generated as a result of the modification is derivative data. The term "derivative data" refers herein to any data of a thin-cloned data set that has been generated independently from cloning of the thin-cloned data set from the source data set. Derivative data may be generated when a memory portion of data that is referenced by the thin-cloned dataset and/or the source dataset is updated with new data, or new data is inserted into the thin-cloned dataset at a new memory portion. The data that has not been modified in the thin-cloned dataset and continues to be shared with the source data set is referred to herein as "common data." The metadata associated with the thin-cloned data set may maintain which references are referencing the common data and which references are referencing the derivative data of the thin-cloned data set.

For example, when a thin-cloned data file is updated with new data, a file system driver allocates a new memory portion and copies over to the memory portion the portion of the common data that is to be updated with new data. The new memory may be allocated in the form of new extents and blocks for the updated files. The file system driver updates the allocated memory and references the allocated memory in the updated thin-cloned data file. The updated data becomes the derivative data of the thin-cloned data file. The metadata of the thin-cloned data file (and/or the file system thereof) may maintain which memory portions contain derivative data and thus are derivative memory portions and/or which memory portions contain common data and thus are common memory portions. Additionally or alternatively, such mapping may be maintained by references to such memory portions.

In an embodiment, the system periodically or upon request generates snapshot(s) of dataset(s), including thin-cloned data set(s). The "snapshot dataset" ("snapshot") term refers herein to a dataset copy of a source data set that exists independently of the source data set but references the source data set rather than storing its own copy of data of the source dataset. For example, a thin cloned data set may be generated as a snapshot data set of a source data set.

As new modifications are performed to the source data set after the generation of the snapshot data set, the snapshot data set continues to reference the original common data. The modified source data set continues to reference the portion of the original common data that was untouched by the modifications. The new data generated by the modifications is only referenced by the modified source dataset. Non-limiting examples of a snapshot dataset are a snapshot data file, a snapshot of a database which may be a cumulative snapshot of all the data file(s) of the database or a filesystem snapshot which may be a cumulative snapshot of the whole file storage and its files that are managed by the file system.

Unlike a snapshot data set, a backup dataset of a source dataset contains at least a portion of the data of the source dataset as a separate full copy rather than a reference. When a backup of a thin-cloned dataset is requested, the backup is performed by storing a copy of the derivative data in the thin-backup data file but not by copying the common data. Accordingly, the size of the backup is reduced by only containing the derivative data. The backup process stores the metadata in association with the thin-backup data set that describes which memory portions are derivative or common.

For example, when data of a thin-cloned data file is read for generating a thin backup file, the file system returns the derivative data but returns empty data for the common data of the thin-cloned data file. Thus, the generated thin-backup data file contains only the derivative data, while the empty data is omitted, generating a sparse file. The metadata of the thin-cloned data file is backed up as part of "backup metadata" that is associated with the thin-backup data file and, therefore, may continue to indicate the common memory portions of the thin-backup data file.

In an embodiment, when a restore is performed, the derivative data stored in the backup data set is restored into a thin-restored data set. For the common data, the restore process may restore the thin-cloned dataset to the snapshot dataset of the source dataset from which the thin-cloned data set was generated. After restoring to the original thin-cloned dataset, the restore process restores the thin-backup data file to the thin-restored data set. Alternatively or additionally, the restore process may use the backup metadata to restore the references to the source common data in the thin-restored data set.

For example, when restoring from a thin-backup data file, the original snapshot data file of the source data file corresponding to the original thin-cloned data file is restored. The reverting to the snapshot of the source data file (the original thin-cloned data file) restores the references to the common data of the thin-cloned data file. The thin-backup data file is used to restore the derivative data of the thin-cloned data file. The restore process copies the backup derivative data from the thin-backup data file into the derivative memory portions of the thin-restored data file. Additionally or alternatively, the backup metadata indicates derivative memory portions and/or common memory portions. The backup metadata may be used to restore the thin-restored data file's references to the common data that is shared with the source data file. Accordingly, the restore process restores the thin-backup data file into the thin-restored data file while only allocating memory for the derivative data and not for the common data.

System Overview

A non-limited example of thin-cloned data set is one or more data files (or the full set of data files of the file system itself) of a thin-cloned pluggable database in a multi-tenant database management system. FIG. 1 is a block diagram that depicts a multi-tenant database management system (mDBMS) upon which embodiment(s) of the invention may be implemented. mDBMS 100, from a client application perspective, has the same interface as any non-multitenant DBMS. Accordingly, a client application (not depicted in FIG. 1) initiates a database connection with mDBMS 100 and requests mDBMS 100 to perform database operations (e.g., serve/modify database objects) using the same techniques as for a non-multitenant DBMS. Therefore, any description of DBMS and techniques thereof similarly apply to mDBMS 100.

Database server 110 of mDBMS 100 may process database operations for the databases of CDB 150. The databases of CDB 150 hosts include PDB Seed 161, PDB 162, and thin-cloned PDB 163. In various implementations, CDB 150 may host many more or fewer PDBs. PDBs may host various user data. For example, PDB 162 may be a human resources (HR) database, while thin-cloned PDB 163 may be an accounts receivable (AR) database. Each PDB may be stored in one or more data files on file storage 180 and may utilize other files from shared resources 152. PDBs are pluggable databases and thus may be "unplugged" and "moved" to be hosted by a different CDB.

The client application may connect to any database of mDBMS 100 to request data operation(s). Upon a connection with database server 110 of mDBMS 100, database server 110 utilizes shared processes and cache 112 for allocating and maintaining the session servicing the operation(s) for the target PDB of CDB 150.

When such an operation causes access to data and/or the modification thereof, mDBMS 100 invokes file system driver 185 to perform access or modification of the corresponding data file(s) in file storage 180. File system driver 185 manages and controls access and modifications of data files in file storage 180. File system driver 185 periodically or upon request may create snapshots of each file, or each PDB (e.g., PDB snapshot 172) or file storage 180 (e.g., file system snapshot 187).

PDBs 161-163 may further utilize shared resources 152 of CDB 150 for storing transactional and non-transactional (non-user) data. Shared resources 152 may include one or more redo logs, undo logs, and other data. Additionally, shared resources 152 may include backups 170 that store backups of PDBs in one or more backup files. A backup of a particular PDB or a set of PDBs may be stored as one or more backup data files. The backup data files may be generated periodically or upon request.

Thin-Cloned PDB

Figure 2:
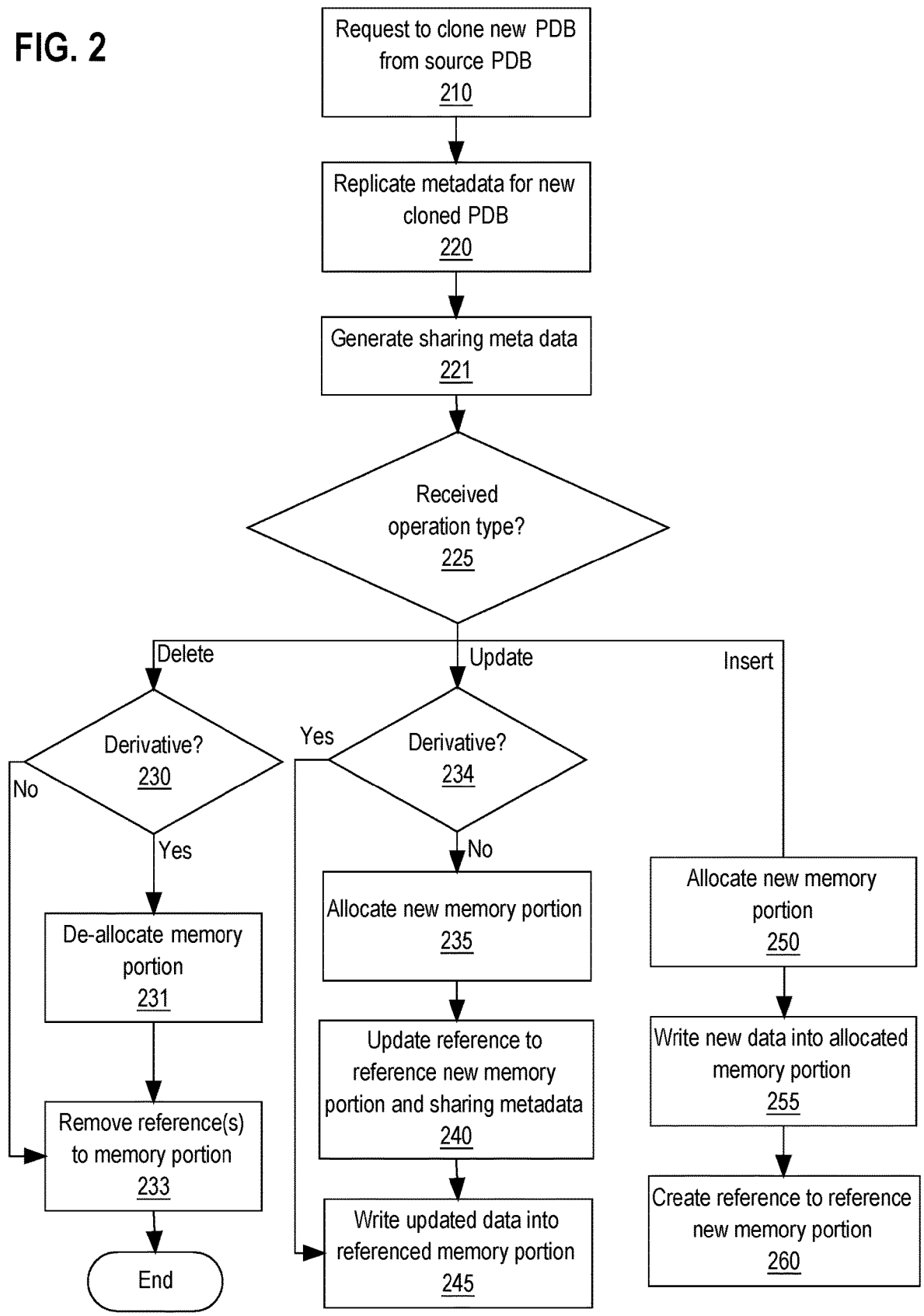
FIG. 2 is a flow diagram that depicts a process of generating a thin cloned PDB, in an embodiment.

FIG. 2 is a flow diagram that depicts the process of generating a thin cloned PDB, in an embodiment. At step 210, mDBMS 100 receives a request to generate a clone PDB. The request may specify the source PDB from which to generate a new PDB. Alternatively, when no source PDB is specified, PDB Seed 161 may be selected as a source PDB. For example, in mDBMS 100, the request may specify PDB 162 (containing the HR database) as the source to generate thin-cloned PDB 163's AR database.

At step 220, mDBMS 100 initiates the replication of the source PDB data file(s) to generate the thin-cloned PDB files. The thin-cloned replication is performed by replicating only the metadata of data file(s) from the source PDB, in an embodiment. In such an embodiment, rather than replicating the data from one memory portion to another, file system driver 185 replicates only references to the memory portions of the source PDB's data file(s).

At step 221, file system driver 185 generates additional sharing, metadata that indicates which memory portions of the newly created thin-cloned data file of the thin-cloned PDB are shared, in an embodiment. The term "sharing metadata" refers to the metadata that indicates the memory portion(s) of one or more data files that contain common data that is shared with the source data file(s) from which the one or more data files were cloned. The sharing metadata may also indicate the memory portion(s), which contain derivative data unique to the thin-cloned data file(s), if any.

In an embodiment, the indication describing a memory portion as shared or derivative may be explicit or implicit. The sharing metadata may explicitly indicate which memory portions are shared, thereby implicitly indicating which memory portions are derivative and vice versa. Initially, after the cloning of the thin-cloned data file is performed, all memory portions in the sharing metadata of the thin-cloned data file are indicated as shared and, thus, containing common data. Sharing metadata may be stored for each thin-cloned data file or per file system instance such as file storage 180.

Figure 3:
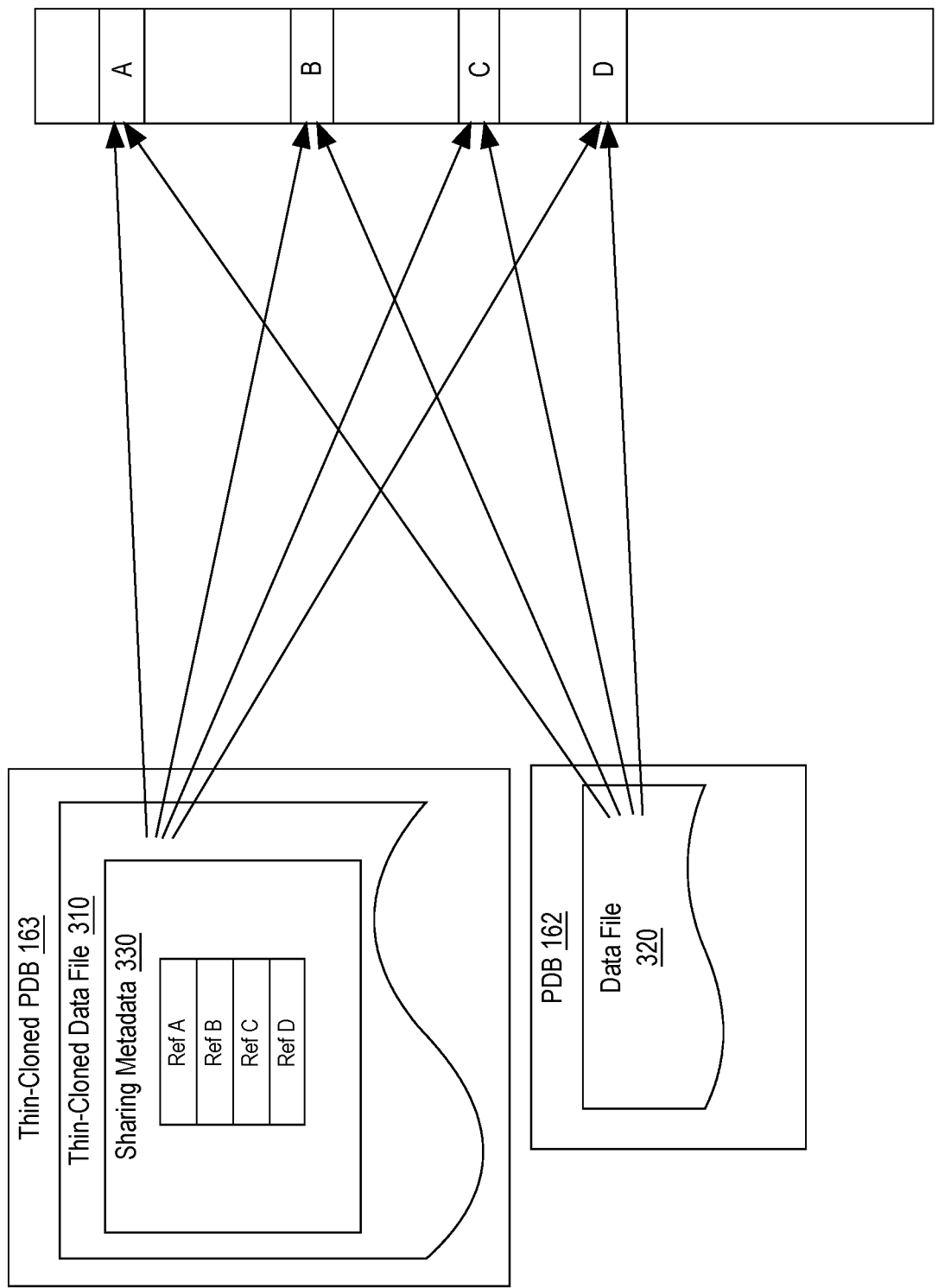
FIG. 3 is a block diagram that depicts a thin cloned PDB cloned from a source PDB, in an embodiment.

FIG. 3 is a block diagram that depicts a thin cloned PDB cloned from a source PDB, in an embodiment. Source PDB 162 includes data file 320, which has four allocated memory portions in file storage 180: A, B, C, and D.

In response to the request to clone PDB 162, mDBMS 100 may generate snapshot PDB 172 of source PDB 162 as thin-cloned PDB 163. To generate thin-cloned PDB 163, file system driver 185 generates a snapshot of data file 320 to create new thin-cloned data file 310. Generating of the snapshot replicates the metadata of data file 320 into new data file 310. The replicated metadata includes references by data file 320 to memory portions A, B, C, and D.

Rather than allocating new memory in file storage 180 for the replica data of data file 320, file system driver 185 generates a snapshot of data file 320 and thereby new data file 310 points to the same common data of data file 320. File system driver 185 generates sharing metadata 330 to indicate which of the memory portions of thin-cloned data file 320 are shared. As depicted in FIG. 3, after the replication and before any file operation on new thin-cloned data file 310, all memory portions referenced portion by data file 320 are shared.

Continuing with FIG. 2, at step 225, file system driver 185 receives a file operation request for a thin cloned data file. The file operation may be a result of mDBMS 100 performing a requested database operation on thin-cloned PDB 163. For example, thin-cloned data file 310 may initially contain a copy of the HR database from PDB 162. Thus, the mDBMS 100 may receive DDL statements to drop one or more tables that are unnecessary for the AR database, insert new user data that is AR specific, or update existing record(s), or any combination of the above, as non-limiting examples.

One or more operations on PDB 163 initiated by a user request or independently by mDBMS 100 cause one or more file operations by file system driver 185 on data file(s) of PDB 163 in file storage 180. At step 225, if the file operation includes deletion of a memory portion referenced by a thin-cloned data file, then file system driver 185 determines whether the referenced memory option is a shared or a derivative based on the sharing metadata at step 230. If the process determines, at step 230, that the memory portion contains derivative data, then the memory portion is not shared with any other data file, and thus, files system driver 185 deallocates the memory portion at step 231. Otherwise, no deallocation occurs, and the source data file continues to reference the shared memory portion regardless of the delete operation for the thin-cloned data file. However, any references from the thin-cloned data file are removed at step 233 for both types of memory portions.

Figure 4:
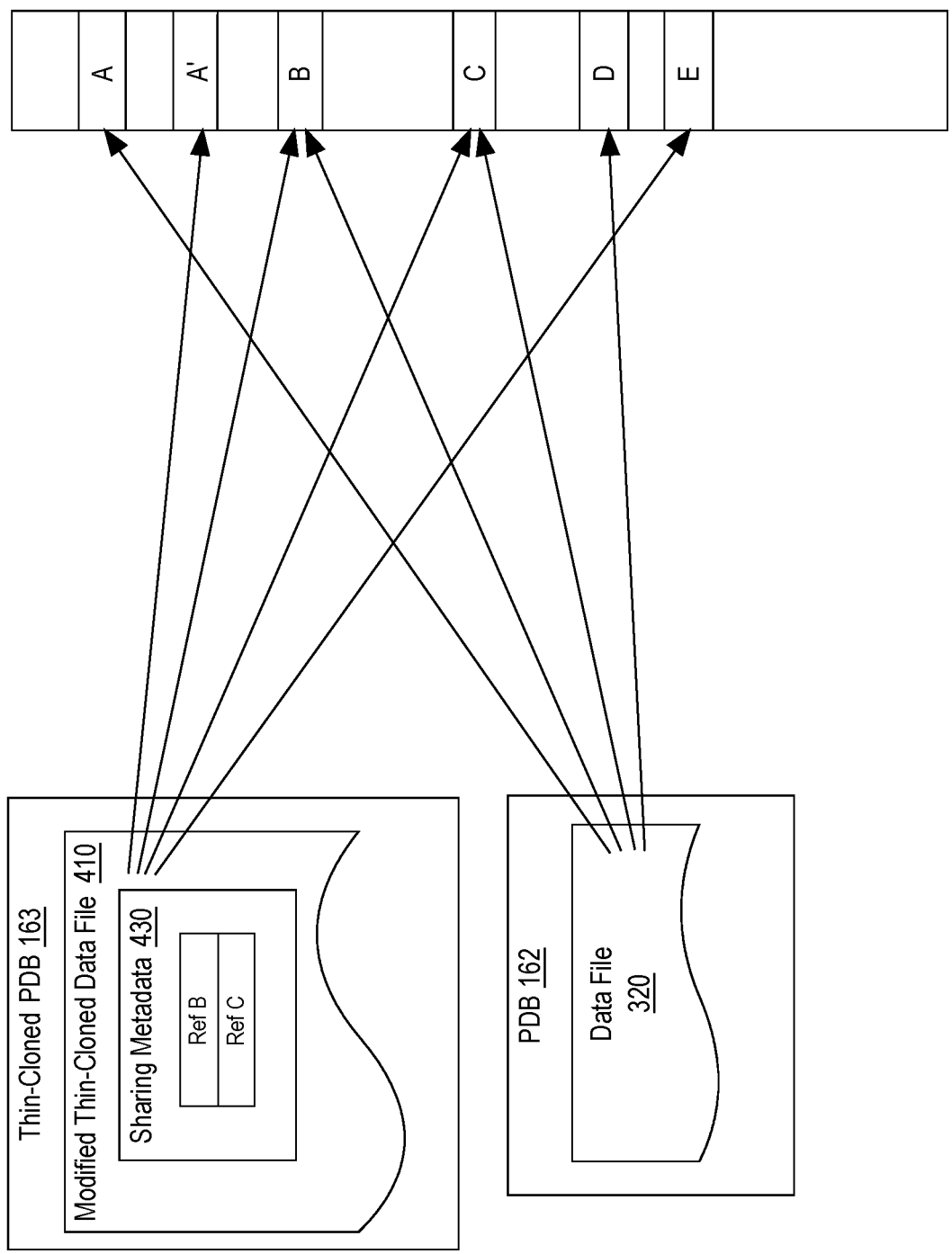
FIG. 4 is a block diagram that depicts a modified thin cloned data file of a thin-cloned PDB that was originally cloned from a source PDB, in an embodiment.

FIG. 4 is a block diagram that depicts a modified thin-cloned data file of a thin-cloned PDB that was originally cloned from a source PDB, in an embodiment. In FIG. 4, thin-cloned data file 410 is a modified version of thin-cloned data file 310 (as depicted in FIG. 3) by file operations of file system driver 185. For example, file system driver 185 executes a delete operation on memory portion D on thin cloned data file 310. Such a delete operation may be a result of the user command to drop a table or delete multiple rows, as non-limiting examples. Using sharing metadata 330 of thin-cloned data file 310, file system driver 185 determines that memory portion D is a shared memory portion containing common data. Accordingly, rather than deallocating memory portion D, file system driver 185 deletes the reference of thin-cloned data file 310 to memory portion D (as depicted in FIG. 3). Therefore, in FIG. 4, modified thin-cloned data file 410 has no reference to memory portion D, and sharing metadata 430 contains no indication for memory portion D.

Continuing with FIG. 2, if it is determined, at step 225, that the file operation is for an update of a memory portion, the process transitions to step 234. File system driver 185 determines whether the memory portion to be updated is a shared or derivative memory portion at step 234. If the memory portion contains derivative data (i.e., the memory portion is a derivative memory portion), then then the process transitions to step 245, and the memory portion is updated accordingly.

Otherwise, if it is determined that the memory portion is a shared memory portion at step 234, then the process proceeds to step 235. At step 235, rather than updating the shared memory portion, file system driver 185 allocates a new memory portion that is a copy of the source memory portion, in an embodiment. At step 240, file system driver 185 modifies the thin-cloned data file to reference the newly allocated memory portion, removing the reference from the originally shared memory portion. Additionally, sharing metadata is updated to remove any reference to the source memory portion at step 240.

At step 245, file system driver 185 updates the referenced memory portion according to the operation, thereby generating or updating derivative data of the thin-cloned data file of the thin-cloned PDB.

For example, continuing with FIG. 3 and FIG. 4, mDBMS 100 determines that memory portion A of thin-cloned data file 310 is to be updated. Such a file operation may be caused by executing an update for a row (or any other database object(s)) stored in memory portion A. To perform the update, file system driver 185 determines that memory portion A is a shared memory portion by performing a lookup in sharing metadata 330 (for example, with the reference to memory portion A of thin-cloned data file 310).

Once determined that memory portion A to be updated is a shared memory portion, file system driver 185 allocates new memory portion A', as depicted in FIG. 4. The memory portion A' may initially contain (or be modified to contain) the same data as source shared memory portion A. The memory portion A' is updated with new data generating the derivative data of the common data in memory portion A. File system driver 185 updates the reference to source memory portion A from thin-cloned data file 310 (as originally depicted in FIG. 3) with the reference to memory portion A' of the derivative data (as depicted in FIG. 4). Sharing metadata 430 is updated to indicate that memory portion A' contains derivative data by, as an example, removing the reference to memory portion A and not inserting any indication that memory portion A' is a shared memory portion.

Continuing with FIG. 2, at step 225, when the operation causes an insert operation into a data file of the thin-cloned PDB, the process transitions to step 250. File system driver 185 allocates a new memory portion for new data at step 250. At step 255, file system driver 185 writes the new data into the newly allocated memory portion according to the operation, thereby generating derivative data for the thin-cloned data file of the thin-cloned PDB. At step 260, file system driver 185 adds a new reference to the thin-cloned data file to reference the newly allocated memory portion. The sharing metadata of the thin-cloned data file may not be modified if the sharing metadata does not track memory portions with derivative data.

For example, continuing with FIG. 3 and FIG. 4, file system driver 185 determines that new data is to be inserted into thin-cloned data file 310. To perform the insert operation, file system driver 185 allocates new memory portion E, as depicted in FIG. 4, and writes the new data into memory portion E. File system driver 185 generates a new reference from modified thin-cloned data file 410 to memory portion E, as further depicted in FIG. 4.

Thin-Clone Backup

In an embodiment, when a thin-cloned data file is backed up, only derivative data of the thin-cloned data file is backed up. Rather than moving data in all memory portions referenced by the thin-cloned data file into a backup file, only the derivative data is stored in the backup file, while the rest of the data, the common data, is not replicated. In response to a read request for a thin-cloned data file from file storage 180, file system driver 185, when reading the derivative memory portion(s), returns derivative data. However, file system driver 185, when reading the shared memory portion(s), returns placeholder indicators, in an embodiment.

The backup process receives such placeholder indicators or the derivative data. In an embodiment, the backup process requests file system driver 185 to write to the thin-backup data file the received placeholder indicator(s). However, when file system driver 185 receives the placeholder indicators, file system driver 185 generates placeholder metadata. The term "placeholder metadata" refers to data that describes information about received placeholder indicators. The information may include the intended location at which the placeholder indicators were to be written in the thin-backup data file and the amount to be allocated in the thin-backup data file for the placeholder indicators. Accordingly, placeholder metadata may describe the location and/or size of memory space (e.g., number of memory portions) that were to be used by the common data if the shared memory portion were to be replicated. The placeholder metadata for a thin-backup data file may be stored in the thin-backup data file or in association thereof.

For example, when the common data of a shared memory portion is read, the backup process may receive the sparse indicator values of 0s (any other value may be used, such as 0xFF) from file system driver 185. The backup process may then request file system driver 185 to write the received sparse indicators into a thin-backup data file. On such a write, file system driver 185 may detect the sparse indicators (e.g., 0's) as empty data. Rather than allocating a memory portion and writing the sparse indicators into the thin-backup data file, file system driver 185 generates sparse file metadata. The sparse file metadata may indicate the amount of data of sparse indicators received (e.g., number of bytes, number of memory portions) and/or at which location in the thin-backup data file such sparse indicators were to be written. Accordingly, in such an example, file system driver 185 generates a sparse file that stores only derivative data and has sparse metadata that describes the location(s) and/or size(s) of the common data.

In an alternative embodiment, in response to detecting placeholder indicator(s), the backup process may skip writing data into the backup data file and instead may generate placeholder metadata that contains information about shared memory portions of the thin-cloned data file (e.g., size and/or locations of shared memory portions in the thin-backup data file if the common data in the memory portions were to be replicated).

Figure 5:
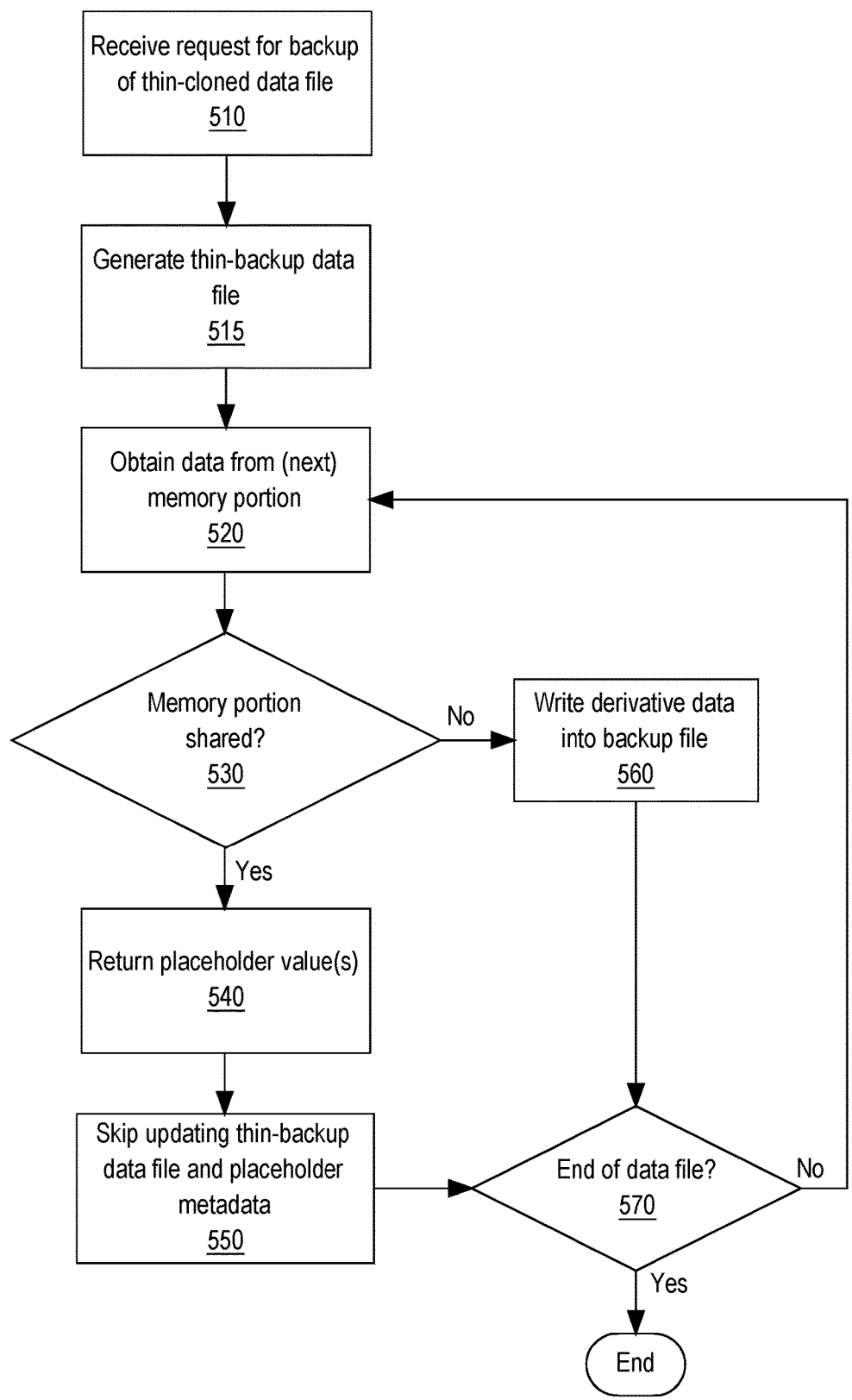
FIG. 5 is a flow diagram that depicts a process of generating a thin-backup data file for a thin-cloned data file, in an embodiment.

FIG. 5 is a flow diagram that depicts a process of generating a thin-backup data file for a thin-cloned data file, in an embodiment. At step 510, mDBMS 100 receives a request to create a backup of a thin-cloned data file. Such a request may be initiated by a user or by mDBMS 100 itself as part of providing data redundancy of its PDBs.

Figure 6A:
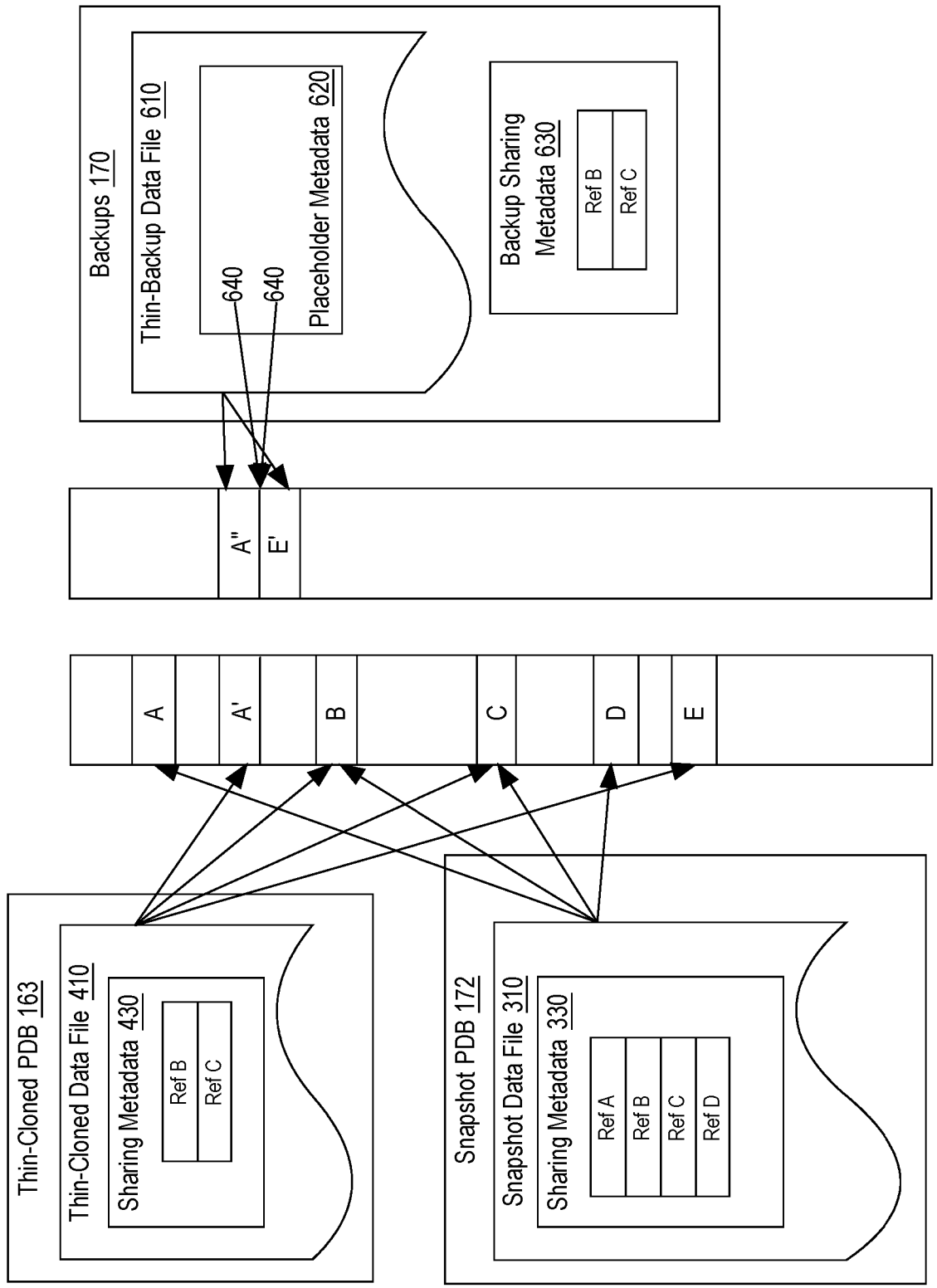
FIG. 6A is a block diagram that depicts a thin-cloned data file of a thin-cloned PDB that is backed up into a thin-backup data file, in an embodiment.

FIG. 6A is a block diagram that depicts a thin-cloned data file of a thin-cloned PDB that is backed up into a thin-backup data file, in an embodiment. Snapshot PDB 172 of source PDB 162 from which thin-cloned PDB 163 includes snapshot thin-cloned data file 310 of data file 320 of source PDB 162. Snapshot thin-cloned data file 310 contains sharing metadata 330, which references the original shared memory portions A, B, C, and D.

At step 515, the backup process generates a data file for the backup of the thin-cloned data file, the thin-backup data file. In an embodiment, the backup process replicates the thin-cloned data file's metadata which includes the sharing metadata to the thin-backup data file. The backup of sharing metadata may be stored in association with the thin-backup data file in backups 170 or in the metadata of the thin-backup data file itself. In an alternative embodiment, no backup of the sharing metadata is performed, and the references to the common data are restored based on the current snapshot associated with the thin-backup data file.

Continuing with FIG. 6A, thin-backup data file 610 is stored in backups 170 along with associated backup sharing metadata 630, a replica of sharing metadata 430. Additionally or alternatively to sharing metadata 330 that references shared memory portions B and C for thin-cloned data file 410, backup sharing metadata 630 may also reference shared memory portions B and C for thin-cloned data file 410. Accordingly, the references to shared portions B and C may be restored from either sharing metadata 330 or backup sharing metadata 630.

At step 520, the backup process requests file system driver 185 to read the thin-cloned data file and return the data to be backed up. In an embodiment, file system driver 185 iterates through the memory portions of the thin-cloned data file to return the data for the backup process at step 520. For example, in FIG. 6A, file system driver 185 iterates through memory portions of thin-cloned data file 410, such as memory portions A', B, C, and E.

At step 530, using the sharing metadata of the thin-cloned data file, file system driver 185 determines whether the data in a memory portion of the thin-cloned data file is part of the common data or the derivative data of the thin-cloned data file. If it is determined that the memory portion is a derivative portion, the derivative data is returned, and the backup process requests storing the derivative data into the backup file at step 560.

For example, continuing with FIG. 6A, memory portion A' is not indicated as a shared memory portion containing common data by sharing metadata 430. Therefore, memory portion A' contains derivative data. Accordingly, file system driver 185, when performing the read of thin-cloned data file 410, returns the content of memory portion A'. The backup process request the storage of the returned content of memory portion A' into thin backup data file 610. File system driver 185 performs the request by allocating memory portion A" (or uses pre-allocated memory portions that include memory portion A") and writing the received content of memory portion A' into memory portion A".

Continuing with FIG. 5, if, at step 530, file system driver 185 determines that the next memory portion is a shared memory portion that contains common data with the source data file. File system driver 185 returns placeholder indicator(s) as returned data for the requested read of the backup process at step 540. Such placeholder indicators may be empty data indicators for sparse files. The backup process requests file system driver 185 to write the returned data to the thin-backup data file, similar to step 560. However, file system driver 185, rather than writing the placeholder indicators into the thin-backup data file, detects that returned data contains placeholder indicator(s) at step 550 and skips writing the returned (empty) data into the thin-backup data file. Instead, file system driver 185 generates placeholder metadata 620 that indicates the received placeholder indicators from the backup process without actually allocating the memory portions corresponding to the shared memory portion of the thin-cloned data file.

For example, file system driver 185, when receiving placeholder indicators, generates sparse empty data reference(s) 640 in placeholder metadata 620 for the common data. In such an example, file system driver 185 generates thin-backup data file 610 as a sparse file in which metadata contains the information for the size and/or location of the shared memory portions, and allocated file storage contains the derivative data.

Continuing with FIG. 6A, as an example, file system driver 185 continues to read thin-cloned data file 410 and reaches memory portion B. File system 185 using sharing metadata 430 determines that memory portion B is a shared memory portion containing common data. Indeed, memory portion B's data is shared between source data file 320 and thin-cloned data file 410. Rather than returning common data of shared memory portion B to the backup process for replicating into thin-backup data file 610, file system driver 185 returns sparse empty data indicators (e.g., '0's) as placeholder indicators.

When the backup process requests file system driver 185 to write sparse empty data indicators into thin-backup data file 610, file system driver 185 identifies that the data received for the write is a sparse empty data indicator and skips writing (and/or allocating a memory portion) in backup data file 610. Instead, file system driver 185 generates placeholder metadata 620 for the memory portions to be allocated and writes information necessary to recreate the placeholder values for the memory portion(s) when thin-backup data file 610 is read. For example, placeholder metadata may store references 640 to the location at which placeholder data should have been stored and/or the size of the placeholder data. Accordingly, thin-backup data file 610 has allocated memory only for the derivative data of thin-cloned data file 410 but may additionally contain information to restore thin-cloned data file 410 in the form of placeholder metadata 620 and backup sharing metadata 630.

Continuing with FIG. 5, at step 570, if other memory portion(s) exist in the thin-cloned data file, then the backup process proceeds to step 520 to back up the next memory portion according to the techniques described herein. If an end of the file has been detected, at step 570, the process ends.

Continuing with FIG. 6A, as an example, thin backup data file 610 is generated as a sparse file. Thin backup data file 610 includes only the derivative data of thin cloned data file 410 in memory portions A" (for derivative memory portion A') and memory portion E' (for derivative memory portion E). The common data of thin-cloned data file 410 continues to be referenced by source data file 320, which may be additionally referenced by backup sharing metadata 630 of thin-backup data file 610. The information about locations at which references to shared memory portions B and C need to be referenced may be stored in placeholder metadata 620.

Figure 6B:
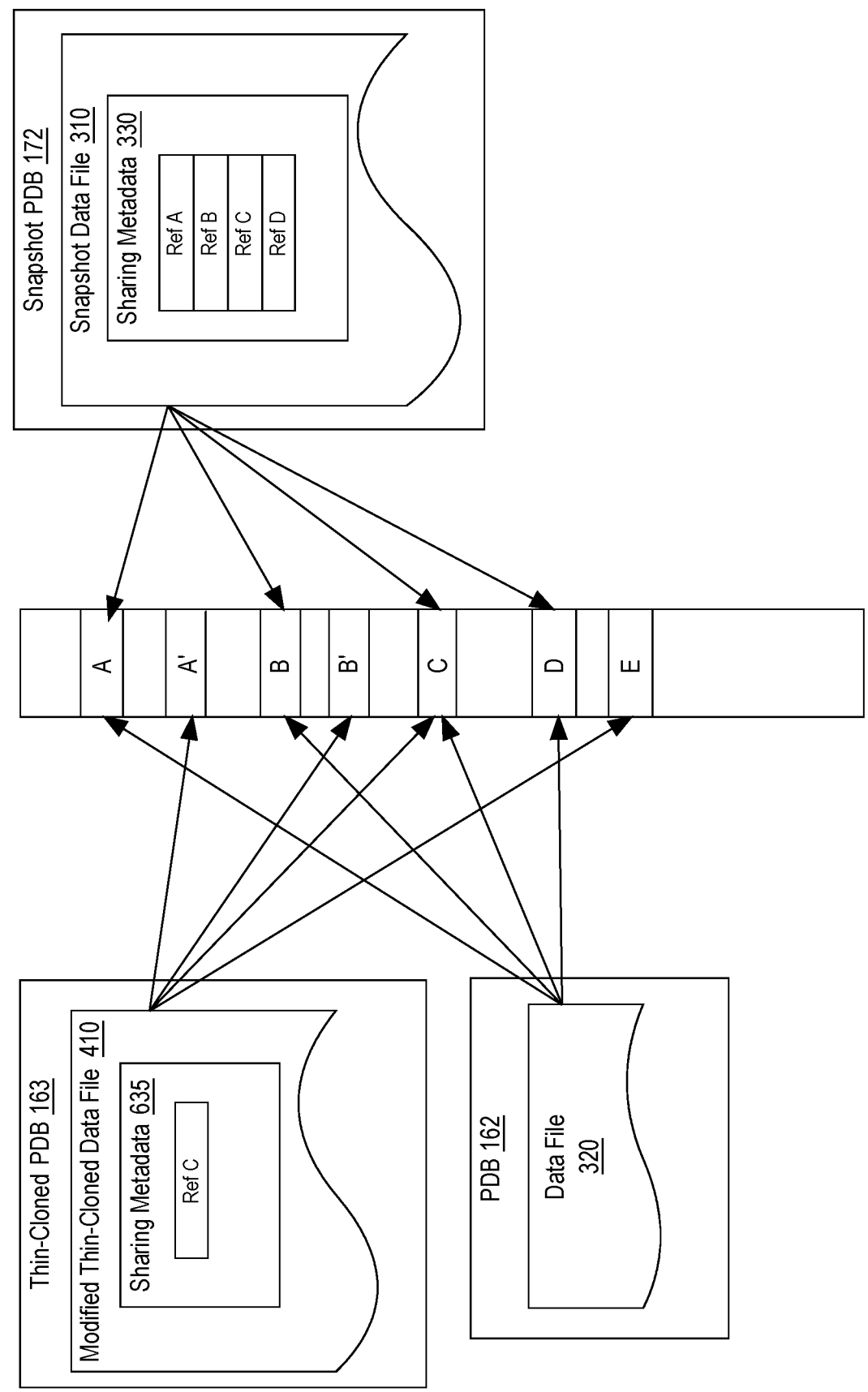
FIG. 6B is a block diagram that depicts a thin-cloned data file of a thin-cloned PDB after a thin backup, in an embodiment.

FIG. 6B is a block diagram that depicts a thin-cloned data file of a thin-cloned PDB after a backup, in an embodiment. For example, after the backup of thin-cloned data file 410, a new modification request is received by thin-cloned PDB 163 that results in modification(s) for shared memory portion B. Accordingly, derivative memory portion B' is generated based on the update, and the reference to shared memory portion B is removed. Modified thin-cloned data file 410 becomes different from thin-backup data file 610 of FIG. 6A by storing additional derivative memory portion B' and not having a reference to shared memory portion B in sharing metadata 635. However, snapshot data file 310 contains the references to memory portions B and C and, when restored, recreates those references, while thin-backup data file 610 of FIG. 6A has the full information on the derivative data that correctly excludes derivative memory portion B' and, additionally, may contain the references to shared memory portions B and C in backup sharing metadata 630.

Restoring Thin-Cloned Backup

In an embodiment, when a thin-backup data file is restored, only derivative data of the thin-backup data file is restored by replicating or moving the derivative data to the restored thin-restored data file. The common data indicated by references stored in the backup sharing metadata is restored by restoring the references to the shared memory portions at the corresponding locations of the restored data file as indicated by the placeholder metadata. The references may be restored by restoring the associated snapshot of the thin-backup data file and/or from the backup sharing metadata.

Figure 7A:
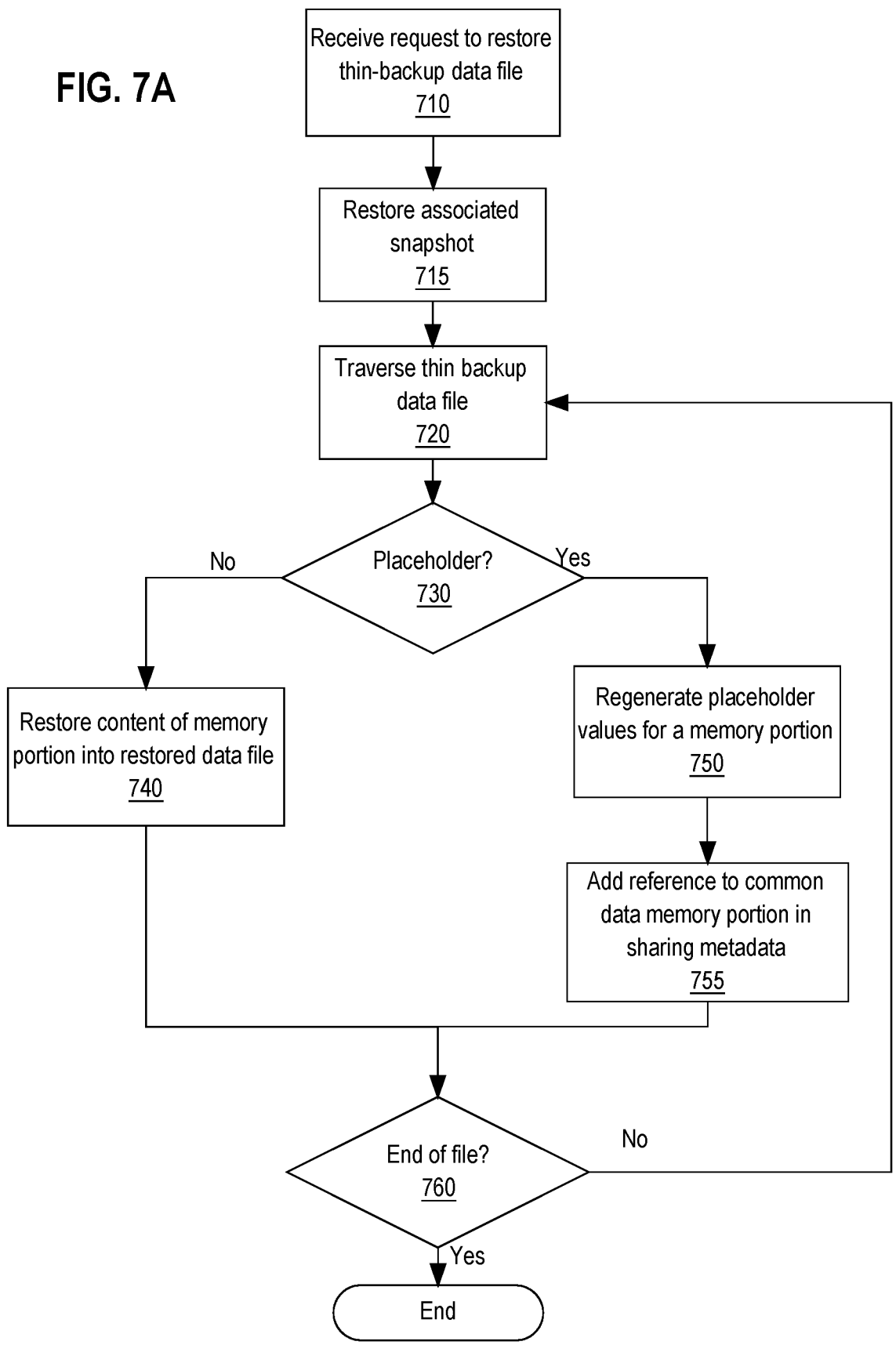
FIG. 7A is a flow diagram that depicts a process of restoring a thin-cloned data file from a thin-backup data file, in an embodiment.

FIG. 7A is a flow diagram that depicts a process of restoring a thin-cloned data file from a thin-backup data file, in an embodiment. At step 710, mDBMS 100 receives a request to restore a thin-cloned data file, the request specifying the thin-backup data file from which to restore. As described above, one non-limiting example of a thin-backup data file is thin-backup data file 610 in backups 170, as depicted in FIG. 6A, and one non-limiting example of a snapshot associated with a backup is snapshot data file 617, as depicted in FIG. 6A and FIG. 6B.

At step 715, the restore process may invoke file system driver 185 to restore the thin-cloned data file to the original snapshot created for the thin-cloned data file as a snapshot of the source data file. When the snapshot is restored, a thin-restored data file may be generated that reflects original references to the shared memory portions as in the original thin-cloned data file of the thin-backup data file.

Figure 7B:
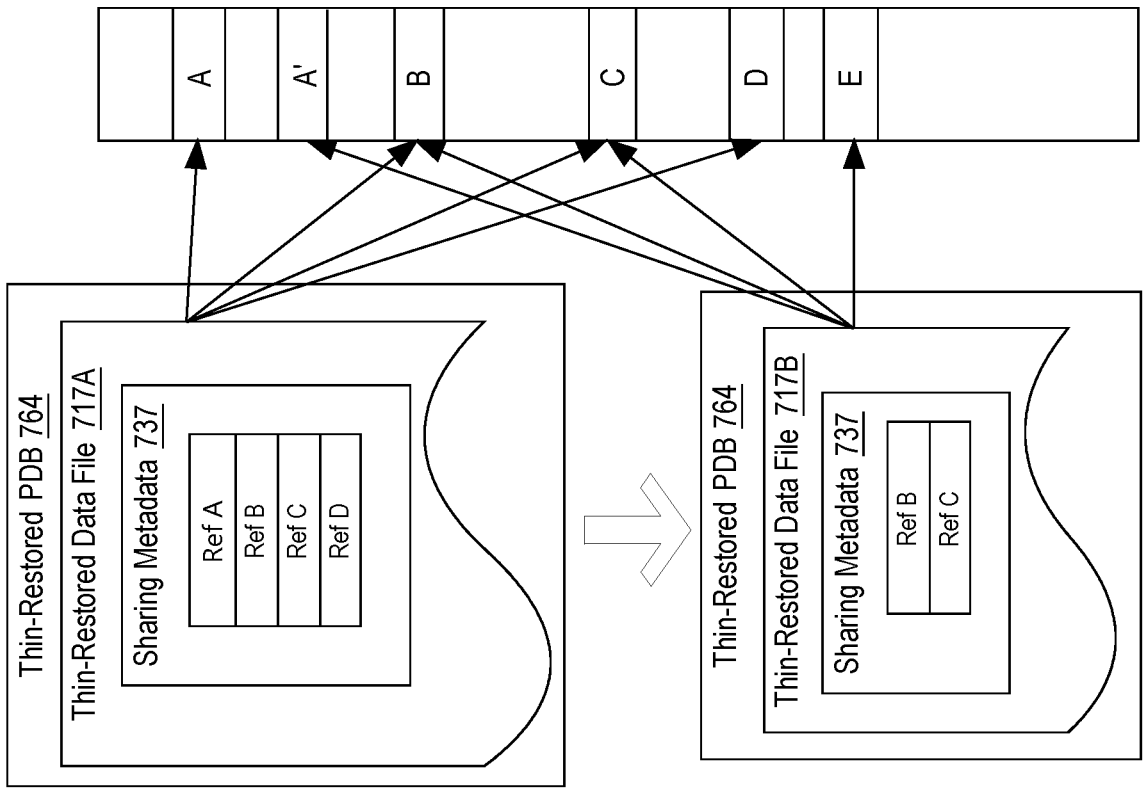
FIG. 7B is a block diagram that depicts a thin-restored data file being restored from a thin-backup data file, in an embodiment.

FIG. 7B is a block diagram that depicts a thin-restored data file being restored from a thin-backup data file, in an embodiment. Thin-restored data file 717A is a restored data file from snapshot data file 310. Because sharing metadata 330 of snapshot data file 330 references sharing portions A, B, C, and D, such references are restored in sharing metadata 737.

At step 720, file system driver 185 traverses the specified thin-backup data file to restore content to a restored thin-cloned data file. The traversal may identify memory portions of derivative data or placeholder metadata for common data.

If at step 730, no placeholder metadata is detected for the location of the selected memory portion of the thin-backup data file, file system driver 185 reads data from the selected memory portion of the thin-backup data file at step 740. The read derivative data from the memory portion(s) is restored (moved or copied) to the restored thin-cloned data file.

For example, in FIG. 6A, when memory portion A" is read from thin-backup data file 610, file system driver 185 allocates a memory portion for the content of the memory portion A" in a restored thin-clone data file (not depicted in FIG. 6A) if none is already allocated. File system driver 185 then copies the derivative data of memory portion A" into the memory portion, thereby creating the replica memory portion for the restored thin-cloned data file.

For example, continuing with FIG. 7B, the restore process may continue with thin-restored data file 717A as thin-restored data file 717B in which if memory portion A' was already allocated as part of the restore of snapshot data file 637, then the derivative data of memory portion A" is copied into memory portion A'. Since no portion has been allocated for memory portion E" of thin-backup data file 610, memory portion E" is allocated for thin-restored data file 717B. The derivative data of memory portion E' is copied into memory portion E".

If, at step 730, placeholder metadata is identified for the selected memory portion, then the process transitions to step 750. At step 750, file system driver 185 may re-generate a placeholder indicator-based content for the memory portion and return such content to the restore process for the selected memory portion.

In an embodiment, alternative to step 715, in response to detecting placeholder indicator(s), at step 755, the restore process requests file system driver 185 to re-generate the corresponding reference to the shared memory portion as referenced in the backup sharing metadata of the thin-backup data file. The reference is restored as a reference to the shared memory portion(s) that stores the common data shared with the source data file of the original thin-cloned data file.

For example, in FIG. 6A, when a memory portion with the placeholder values of '0' are re-generated and read from thin-backed data file 610, file system driver 185 receives a request to restore the corresponding reference for the memory portion. Accordingly, file system driver 185 accesses backup sharing metadata 630 and retrieves Ref B, and restores the reference to the same memory portion in the restored thin-cloned data file.

The process continues until the end of the backup file is detected at step 760, and thereby, the thin-backup data file is fully restored into the restored thin-cloned data file.

Mutable Source Data File

The source data file of a thin-backup data file may be modified such that the common data in one or more shared memory portions is changed. Accordingly, if the thin-backup data file is backed up before the modification but is restored after the modification to a shared memory portion, the thin-restored data may reference newly modified common data that is different from the original common data in the thin-cloned data file. Therefore, the thin-restored data file would be corrupted in such an example.

In an embodiment, a source data file is backed up into a source backup data file that contains the original common data of the originally shared memory portion(s). The backup of the source data file may be performed in response to a modification of common data in a shared portion or when the backup of a thin-clone data file that is sharing the shared memory portion is performed.

In an embodiment in which the source data file is mutable, when the thin-cloned data file of the source data file is backed up, additional information is stored in the backup sharing metadata indicating the version of the shared memory portion(s) for the reference(s). Additionally or alternatively, the metadata of the backup source data file maintains the mapping of memory portions of the source data file and the corresponding memory portions of the backup source data file.

When the restore of a thin-backup data file is initiated, the restore process also restores the source backup data file, thereby restoring the common data in the memory portion(s). When the reference(s) of the thin-restored data file are restored, the restore process updates the references to reference the memory portions of the common data of the restored source data file. In an embodiment, file system driver 185 maintains mapping between the restored source data file's memory portions, the corresponding backup source data file memory portions, and the corresponding source data file's memory portions. Using the mapping, the restore process may restore the thin-restored data file's references to the common data to reference the corresponding restored source data file's memory portions.

Database Management System Overview

A database management system (DBMS) manages a database. A DBMS may comprise one or more database servers. A database comprises database data and a database dictionary that are stored on a persistent memory mechanism, such as a set of hard disks. Database data may be organized into database objects and stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology to refer to database objects.

In embodiments, the databases may be structured as key-value stores (e.g., NoSQL or JSON) where different database objects may represent different data structures. Key-values and associated objects can be referenced, for example, utilizing lookup tables such as hash tables.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database schema, including database containers, such as tables, views, or complex data types. SQL/XML is a common extension of SQL used when manipulating XML data in an object-relational database. Although the embodiments of the invention are described herein using the term "SQL," the invention is not limited to just this particular database query language and may be used in conjunction with other database query languages and constructs.

A client may issue a series of requests, such as requests for execution of queries, to a database server by establishing a database session, referred to herein as "session." A session comprises a particular connection established for a client to a database server, such as a database instance, through which the client may issue a series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

Database services are associated with sessions maintained by a DBMS with clients. Services can be defined in a data dictionary using data definition language (DDL) statements. A client request to establish a session may specify a service. Such a request is referred to herein as a request for the service. Services may also be assigned in other ways, for example, based on user authentication with a DBMS. The DBMS directs requests for a service to a database server that has been assigned to running that service. The one or more computing nodes hosting the database server are referred to as running or hosting the service. A service is assigned, at run-time, to a node in order to have the node host the service. A service may also be associated with service-level agreements, which are used to assign a number of nodes to services and allocate resources within nodes for those services. A DBMS may migrate or move a service from one database server to another database server that may run on a different one or more computing nodes. The DBMS may do so by assigning the service to be run on the other database server. The DBMS may also redirect requests for the service to the other database server after the assignment. In an embodiment, after successfully migrating the service to the other database server, the DBMS may halt the service running in the original database server.

A multi-node database management system is made up of interconnected nodes that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system may be allocated to running a particular database server's software. Each combination of the software and allocation of resources from a node is a server that is referred to herein as a "server instance" or "instance." A database server may comprise multiple database instances, some or all of which are running on separate computers, including separate server blades.

Software Overview

Figure 8:
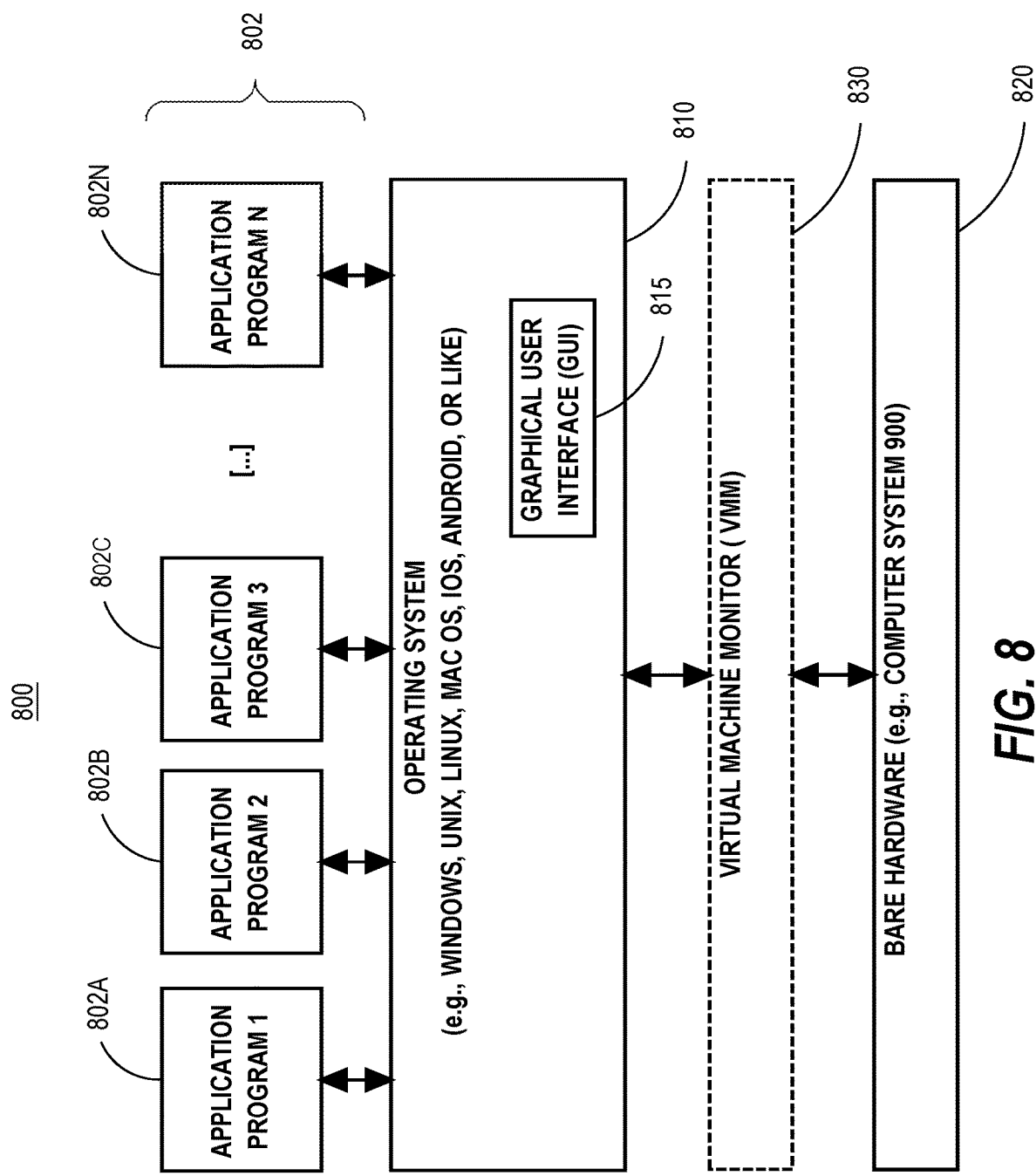
FIG. 8 is a block diagram of a basic software system, in one or more embodiments.
Figure 9:
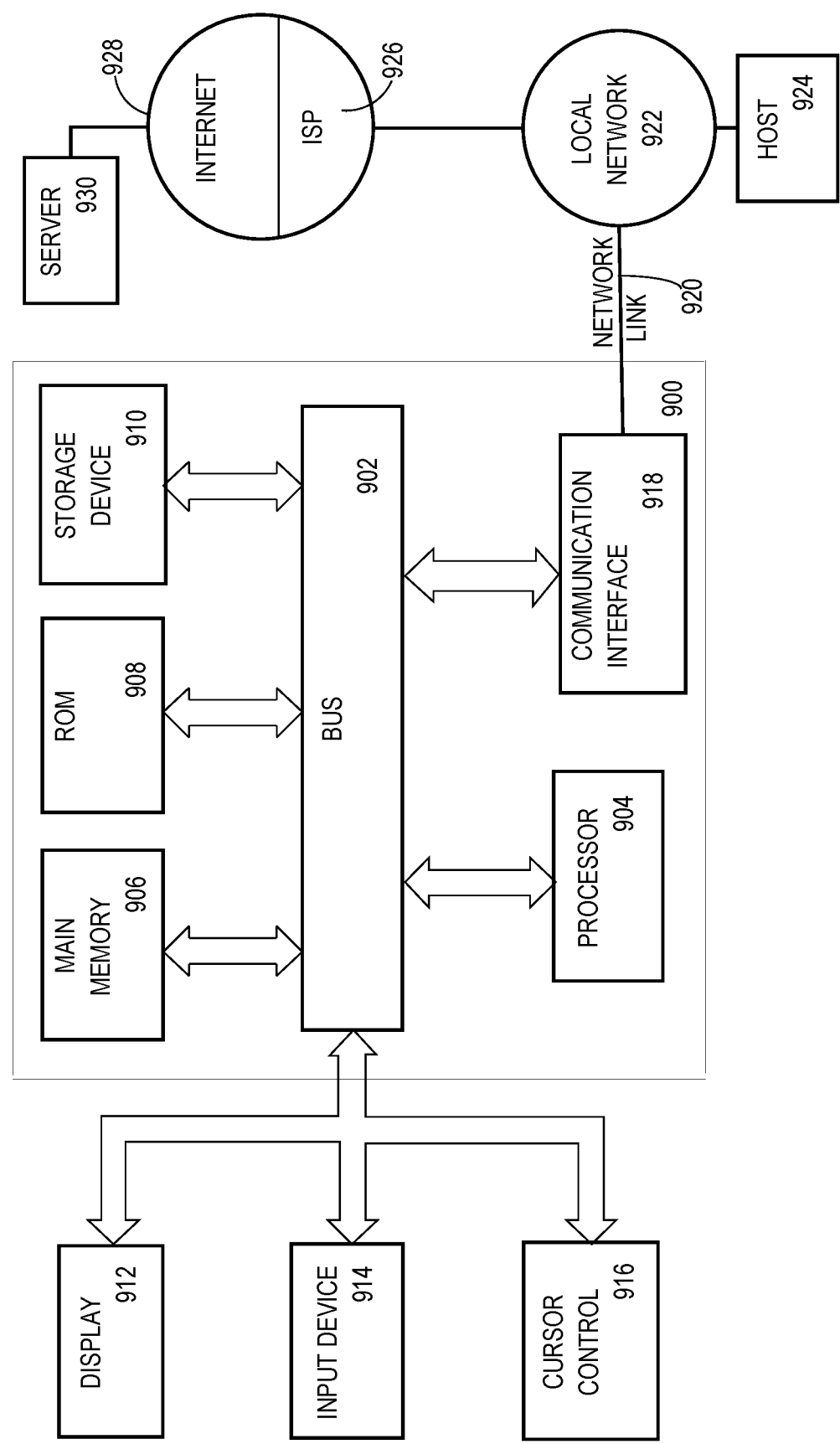
FIG. 9 is a block diagram that illustrates a computer system upon which an embodiment of the invention may be implemented.

FIG. 8 is a block diagram of a basic software system 800 that may be employed for controlling the operation of computing system 900 of FIG. 9. Software system 800 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 900. Software system 800, which may be stored in system memory (RAM) 906 and on fixed storage (e.g., hard disk or flash memory) 910, includes a kernel or operating system (OS) 810.

The OS 810 manages low-level aspects of computer operation, including managing execution of processes, memory allocation, file input and output (I/O), and device I/O. One or more application programs represented as 802A, 802B, 802C . . . 802N, may be "loaded" (e.g., transferred from fixed storage 910 into memory 906) for execution by the system 800. The applications or other software intended for use on computer system 900 may also be stored as a set of downloadable computer-executable instructions, for example, for downloading and installation from an Internet location (e.g., a Web server, an app store, or another online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 904) of computer system 900. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 900.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 900 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random access memory (RAM) or another dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read-only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal, and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926, in turn, provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
receiving a request to backup a thin-cloned data set to a backup data set, the thin-cloned data set comprising one or more references to particular common data of a source data set from which the thin-cloned data set is cloned and derivative data, different from the particular common data, of the thin-cloned data set;
performing a backup of the thin-cloned data set into the backup data set by storing the derivative data, of the thin-cloned data set, in the backup data set without storing the particular common data into the backup data set;
the performing of the backup further comprising receiving one or more indicators indicating one or more backup locations of the backup data set, at which the particular common data is referenced for the thin-cloned data set.

2. The method of claim 1, further comprising:
performing a restore of the backup data set to a restored data set, the performing of the restore of the backup data set comprising:
storing the derivative data, of the thin-cloned data set, from the backup data set to the restored data set;
restoring a snapshot of the source data set associated with the thin-cloned data set thereby restoring one or more restored references for the restored data set corresponding to the one or more references of the thin-cloned data set referencing the particular common data of the source data set.

3. The method of claim 1, further comprising:
receiving a request to clone the source data set into the thin-cloned data set;
in response to the request to clone, storing in association with the thin-cloned data set, one or more original references to original common data of the source data set without storing the original common data into the thin-cloned data set;
receiving a write request to the thin-cloned data set that references at least in part a portion of the original common data of the source data set;
in response to the write request, replicating the portion of the original common data of the source data set into the thin-cloned data set thereby generating the derivative data of the thin-cloned data set and performing the write request on the derivative data of the thin-cloned data set;

removing any reference to the portion of the original common data of the source data set from being associated with the thin-cloned data set.

4. The method of claim 1, wherein the thin-cloned data set is a thin-cloned data file, the backup data set is a thin-backup data file, the source data set is a source data file and wherein the particular common data is referenced by the thin-cloned data file and is stored in one or more particular shared memory portions that are also referenced by the source data file from which the thin-cloned data file was cloned, the method further comprising:
  iterating through a plurality of memory portions of the thin-cloned data file;
  determining that a first memory portion, at a first location within the plurality of memory portions of the thin-cloned data file, is one of the one or more particular shared memory portions;
  in response to determining that the first memory portion of the thin-cloned data file is a shared memory portion:
    storing first placeholder metadata indicating a first backup location of the thin-backup data file for at least a first portion of the particular common data without storing the at least first portion of the particular common data in the thin-backup data file.

5. The method of claim 4, wherein the thin-backup data file is a sparse file and the first placeholder metadata indicates empty data of the sparse file.

6. The method of claim 4, further comprising:
  determining that a next memory portion of the plurality memory portions of the thin-cloned data file is not a shared memory portion;
  in response to determining that the next memory portion of the plurality of memory portions of the thin-cloned data file is not a shared memory portion, storing the derivative data of the next memory portion into the backup data file.

7. The method of claim 4, further comprising:
  receiving a request to clone a source pluggable database (PDB) of a multi-tenant database management system (mDBMS), the source PDB comprising the source data file;
  in response to the request to clone the source PDB, generating a thin-cloned PDB for the mDBMS, the thin-cloned PDB comprising the thin-cloned data file;
  receiving a request to modify data of the thin-cloned PDB of the mDBMS;
  in response to the request to modify data of the thin-cloned PDB, generating derivative data of the thin-cloned data file of the thin-cloned PDB.

8. The method of claim 4, further comprising:
  receiving a request to clone a source pluggable database (PDB) of a multi-tenant database management system (mDBMS), the source PDB comprising the source data file;
  in response to the request to clone the source PDB, generating a thin-cloned PDB for the mDBMS, the thin-cloned PDB comprising the thin-cloned data file;
  in response to a request to backup the thin-cloned PDB of the mDBMS, generating a thin-backup PDB for the mDBMS, the thin-backup PDB comprising the thin-backup data file.

9. The method of claim 4, further comprising:
  performing a restore of the thin-backup data file to a thin-restored data file, the performing of the restore of the thin-backup data file comprising:
    restoring a snapshot of the source data file associated with the thin-backup data file into the thin-restored data file, the restoring the snapshot of the source data file comprising restoring one or more snapshot references to the particular common data into corresponding one or more restored references of the thin-restored data file referencing the particular common data;
  traversing the thin-backup data file, the traversing comprising detecting whether a second placeholder metadata indicates the backup derivative data;
  if the second placeholder metadata indicates backup derivative data, writing one or more traversed memory portions to the thin-restored data file.

10. The method of claim 9, further comprising:
  if the second placeholder metadata fails to indicate backup derivative data, retrieving a second backup reference, the second backup reference including information for at least a second portion of the particular common data that is a shared memory with the source data file and corresponds to backup placeholder metadata;
  restoring the second backup reference of the backup data file into a corresponding restored reference in the restored data file at a restored location in the restored data file corresponding to a second backup location of the backup data file, the restored reference referencing the at least second portion of the particular common data that is stored in a shared memory portion of the one or more particular shared memory portions of the source data file.

11. The method of claim 4, further comprising:
  receiving a request to clone the source data set into the thin-cloned data set;
  in response to the request to clone, storing in association with the thin-cloned data set, one or more original references to original common data of the source data set without storing the original common data into the thin-cloned data set;
  receiving a write request to the thin-cloned data set that references at least in part a portion of the original common data of the source data set;
  in response to the write request, replicating the portion of the original common data of the source data set into the thin-cloned data set thereby generating the derivative data of the thin-cloned data set and performing the write request on the derivative data of the thin-cloned data set;
  removing any reference to the portion of the original common data of the source data set from being associated with the thin-cloned data set.

12. One or more non-transitory computer-readable media storing a set of instructions, wherein the set of instructions includes instructions, which when executed by one or more hardware processors, cause:
  receiving a request to backup a thin-cloned data set to a backup data set, the thin-cloned data set comprising one or more references to particular common data of a source data set from which the thin-cloned data set is cloned and derivative data, different from the particular common data, of the thin-cloned data set;
  performing a backup of the thin-cloned data set into the backup data set by storing the derivative data, of the thin-cloned data set, in the backup data set without storing the particular common data into the backup data set;
  the performing of the backup further comprising receiving one or more indicators indicating one or more backup locations of the backup data set, at which the particular common data is referenced for the thin-cloned data set.

13. The one or more non-transitory computer-readable media of claim 12, wherein the set of instructions further includes instructions, which when executed by said one or more hardware processors, cause:
performing a restore of the backup data set to a restored data set, the performing of the restore of the backup data set comprising:
storing the derivative data, of the thin-cloned data set, from the backup data set to the restored data set;
restoring a snapshot of the source data set associated with the thin-cloned data set thereby restoring one or more restored references for the restored data set corresponding to the one or more references of the thin-cloned data set referencing the particular common data of the source data set.

14. The one or more non-transitory computer-readable media of claim 12, wherein the set of instructions further includes instructions, which when executed by said one or more hardware processors, cause:
receiving a request to clone the source data set into the thin-cloned data set;
in response to the request to clone, storing in association with the thin-cloned data set, one or more original references to original common data of the source data set without storing the original common data into the thin-cloned data set;
receiving a write request to the thin-cloned data set that references at least in part a portion of the original common data of the source data set;
in response to the write request, replicating the portion of the original common data of the source data set into the thin-cloned data set thereby generating the derivative data of the thin-cloned data set and performing the write request on the derivative data of the thin-cloned data set;
removing any reference to the portion of the original common data of the source data set from being associated with the thin-cloned data set.

15. The one or more non-transitory computer-readable media of claim 12, wherein the thin-cloned data set is a thin-cloned data file, the backup data set is a thin-backup data file, the source data set is a source data file and wherein the particular common data is referenced by the thin-cloned data file and is stored in one or more particular shared memory portions that are also referenced by the source data file from which the thin-cloned data file was cloned, and wherein the set of instructions further includes instructions, which when executed by said one or more hardware processors, cause:
iterating through a plurality of memory portions of the thin-cloned data file;
determining that a first memory portion, at a first location within the plurality of memory portions of the thin-cloned data file, is one of the one or more particular shared memory portions;
in response to determining that the first memory portion of the thin-cloned data file is a shared memory portion:
storing first placeholder metadata indicating a first backup location of the thin-backup data file for at least a first portion of the particular common data without storing the at least first portion of the particular common data in the thin-backup data file.

16. The one or more non-transitory computer-readable media of claim 15, wherein the thin-backup data file is a sparse file and the first placeholder metadata indicates empty data of the sparse file.

17. The one or more non-transitory computer-readable media of claim 15, wherein the set of instructions further includes instructions, which when executed by said one or more hardware processors, cause:
determining that a next memory portion of the plurality memory portions of the thin-cloned data file is not a shared memory portion;
in response to determining that the next memory portion of the plurality of memory portions of the thin-cloned data file is not a shared memory portion, storing the derivative data of the next memory portion into the backup data file.

18. The one or more non-transitory computer-readable media of claim 15, wherein the set of instructions further includes instructions, which when executed by said one or more hardware processors, cause:
receiving a request to clone a source pluggable database (PDB) of a multi-tenant database management system (mDBMS), the source PDB comprising the source data file;
in response to a request to clone the source PDB, generating a thin-cloned PDB for the mDBMS, the thin-cloned PDB comprising the thin-cloned data file;
in response to a request to backup the thin-cloned PDB of the mDBMS, generating a thin-backup PDB for the mDBMS, the thin-backup PDB comprising the thin-backup data file.

19. The one or more non-transitory computer-readable media of claim 15, wherein the set of instructions further includes instructions, which when executed by said one or more hardware processors, cause:
performing a restore of the thin-backup data file to a thin-restored data file, the performing of the restore of the thin-backup data file comprising:
restoring a snapshot of the source data file associated with the thin-backup data file into the thin-restored data file, the restoring the snapshot of the source data file comprising restoring one or more snapshot references to the particular common data into corresponding one or more restored references of the thin-restored data file referencing the particular common data;
traversing the thin-backup data file, the traversing comprising detecting whether a second placeholder metadata indicates backup derivative data;
if the second placeholder metadata indicates the backup derivative data, writing one or more traversed memory portions to the thin-restored data file.

20. The one or more non-transitory computer-readable media of claim 19, wherein the set of instructions further includes instructions, which when executed by said one or more hardware processors, cause:
if the second placeholder metadata fails to indicate backup derivative data, retrieving a second backup reference, the second backup reference including information for at least a second portion of the particular common data that is a shared memory with the source data file and corresponds to backup placeholder metadata;
restoring the second backup reference of the backup data file into a corresponding restored reference in the restored data file at a restored location in the restored data file corresponding to a second backup location of the backup data file, the restored reference referencing the at least second portion of the particular common data that is stored in a shared memory portion of the one or more particular shared memory portions of the source data file.

\* \* \* \* \*

UNITED STATES PATENT AND TRADEMARK OFFICE
CERTIFICATE OF CORRECTION

PATENT NO. : 11,983,076 B2
APPLICATION NO. : 17/966772
DATED : May 14, 2024
INVENTOR(S) : Engle et al.

Page 1 of 1

It is certified that error appears in the above-identified patent and that said Letters Patent is hereby corrected as shown below:

In the Specification

In Column 17, Line 8, delete "DbaaS" and insert -- DBaaS --, therefor.

In Column 19, Line 60, delete "system" and insert -- system. --, therefor.

In the Claims

In Column 22, Line 9, in Claim 9, after "indicates" delete "the".

In Column 22, Line 10, in Claim 9, after "indicates" insert -- the --, therefor.

In Column 24, Line 25, in Claim 18, delete "a" and insert -- the --, therefor.

Signed and Sealed this
Twenty-fourth Day of September, 2024

Katherine Kelly Vidal
*Director of the United States Patent and Trademark Office*